(12) United States Patent
Weisbach

(10) Patent No.: US 10,758,854 B2
(45) Date of Patent: Sep. 1, 2020

(54) FILTER FRAME HEADER LOCKING DEVICE

(71) Applicant: John F. Weisbach, Louisville, KY (US)

(72) Inventor: John F. Weisbach, Louisville, KY (US)

(*) Notice: Subject to any disclaimer, the term of this patent is extended or adjusted under 35 U.S.C. 154(b) by 160 days.

(21) Appl. No.: 15/878,249

(22) Filed: Jan. 23, 2018

(65) Prior Publication Data

US 2018/0221802 A1 Aug. 9, 2018

Related U.S. Application Data

(60) Provisional application No. 62/449,550, filed on Jan. 23, 2017.

(51) Int. Cl.
*B01D 53/22* (2006.01)
*B01D 46/00* (2006.01)
*B01D 46/02* (2006.01)

(52) U.S. Cl.
CPC ..... *B01D 46/0005* (2013.01); *B01D 46/0016* (2013.01); *B01D 46/023* (2013.01)

(58) Field of Classification Search
CPC .............. B01D 46/023; B01D 46/0005; B01D 46/0016
See application file for complete search history.

(56) References Cited

U.S. PATENT DOCUMENTS 3,138,658 A * 6/1964 Weimer, Jr. .......... H01R 4/2495
174/94 R
3,807,147 A 4/1974 Schoonen
(Continued)

*Primary Examiner* — Anthony R Shumate
(74) *Attorney, Agent, or Firm* — Carrithers Law Office, PLLC

(57) ABSTRACT

A header containing a multi-toothed tab forming a series of ratchets formed therein cooperatively engages a lanced section extending across the web of the cross section and depressed toward the inside of the cross section a selected depth that is greater than the tab thickness. One edge of the lanced and formed surface is formed with an upturned lip that functions as a pawl for the ratchets on the tab. Insertion of the tab into the lanced section of the receiver, each ratchet will be forced over the paw of the lanced section. The lanced section acts as a spring to allow the ratchet to pass over the paw and then pop back to its previous location ready to be flexed again for the next ratchet.

The header includes a longitudinal channel having a base channel and upwardly extending channel sidewalls and a pair of spaced apart aligned longitudinal reinforcement ribs extending along said longitudinal channel base. The channel sidewalls including a pair of inwardly projecting longitudinal shoulders spaced apart from and aligned with the reinforcement ribs. The longitudinal channel member include a first male end including a tab with two lateral half tangs for cooperatively engaging an opposing channel receiver including two lateral lanced portions forming inwardly raised transverse flanges on either side of said channel base, each with an upwardly projecting lip for cooperative engagement with the two tangs disposed on the tab surface of the opposing distal end of the longitudinal channel member. The channel receiver has two inwardly extending dimples which cooperatively engage an inwardly canted end portion of the tab to maintain engagement of the tangs with said upwardly projecting lips.

5 Claims, 13 Drawing Sheets

(56) References Cited

U.S. PATENT DOCUMENTS

| | | | | |
|---|---|---|---|---|
| 3,962,795 A | * | 6/1976 | Ross | F41G 1/38 42/122 |
| 4,033,214 A | * | 7/1977 | Pearl | B24B 3/361 83/174 |
| 4,065,199 A | * | 12/1977 | Andre | H01B 7/08 439/498 |
| 4,101,108 A | * | 7/1978 | Klein | A47B 57/40 248/223.31 |
| 4,300,927 A | | 11/1981 | Day | |
| 4,312,648 A | | 1/1982 | Day | |
| 4,325,718 A | | 4/1982 | Burkhead | |
| 4,356,011 A | | 10/1982 | Day | |
| 4,508,319 A | * | 4/1985 | Tappan | E04H 17/14 256/1 |
| 4,941,805 A | * | 7/1990 | Matthews | F04D 29/263 416/204 R |
| 5,343,592 A | * | 9/1994 | Parise | A47L 9/181 15/353 |
| 5,554,203 A | | 9/1996 | Borkent et al. | |
| 5,645,535 A | | 12/1997 | Hintenlang et al. | |
| 6,131,356 A | * | 10/2000 | Gieseke | E06B 3/6604 52/456 |
| 6,445,541 B1 | * | 9/2002 | Boutaghou | G11B 5/54 360/235.4 |
| 6,451,079 B1 | | 9/2002 | Lange et al. | |
| 7,128,771 B2 | | 10/2006 | Harden | |
| 7,886,494 B1 | * | 2/2011 | Schott | E04F 15/04 52/489.1 |
| 8,029,585 B2 | | 10/2011 | Sundvik et al. | |
| 8,105,409 B2 | | 1/2012 | Mann et al. | |
| 8,518,136 B2 | | 8/2013 | Weise | |
| 8,690,980 B2 | | 4/2014 | Eyers et al. | |
| 8,764,871 B2 | | 7/2014 | Dralle | |
| 9,067,159 B2 | | 6/2015 | Soderhom et al. | |
| 2004/0260198 A1 | * | 12/2004 | Rothberg | A61B 10/06 600/564 |
| 2005/0195529 A1 | * | 9/2005 | Tsuchida | G11B 5/484 360/234.5 |
| 2007/0199888 A1 | * | 8/2007 | Japp | A47J 31/605 210/474 |
| 2007/0251168 A1 | * | 11/2007 | Turner | E04B 2/7457 52/288.1 |
| 2009/0031682 A1 | | 2/2009 | Derek et al. | |
| 2009/0049811 A1 | | 2/2009 | Choi | |
| 2009/0100813 A1 | * | 4/2009 | Iddings | B01D 46/009 55/489 |
| 2009/0107088 A1 | | 4/2009 | Sundvik | |
| 2009/0172951 A1 | * | 7/2009 | Frank | B26B 1/044 30/161 |
| 2010/0126124 A1 | | 5/2010 | Scott | |
| 2013/0074463 A1 | | 3/2013 | Kulkarni | |
| 2013/0263744 A1 | * | 10/2013 | Osendorf | B01D 46/0005 96/380 |
| 2015/0101298 A1 | * | 4/2015 | Osendorf | B01D 46/2414 55/502 |
| 2015/0128540 A1 | | 5/2015 | Eyers | |
| 2016/0375382 A1 | * | 12/2016 | Girondi | B01D 35/147 210/232 |
| 2017/0229799 A1 | * | 8/2017 | Little | H01R 13/6471 |

* cited by examiner

FILTER FRAME HEADER LOCKING DEVICE

TECHNICAL FIELD

The present invention relates to the field of pocket filter assemblies for supporting filter media bags for removing solids from air or gaseous mediums wherein the filter whereby multiple bag filter elements held together in a sub-frame are supported by a rectangular header frame.

BACKGROUND OF THE INVENTION

Typically, a filter cartridge is fixed across the interior of a gas duct so that particulate materials are removed from the gas stream flowing through the interior of each of the filter pockets. When it becomes necessary to replace the filter media in the filter cartridge, the entire cartridge is removed and thrown away and a new cartridge installed in its place.

A common type of air filter referred to as a pocket filter cartridge generally includes a plurality of relatively flat wedge-shaped filter bags fastened to a common mounting frame so that the cartridge includes a series of filter pockets suspended from the frame in adjacent side-by-side relation and resembling a stack of books or an accordion.

Pocket filter assemblies having at least one and typically a plurality of filter bags having an open end attaching to a rectangular flat sub-frame fastened inside the open end of the bag. The sub-frames are fastened together, side by side, and then the sub-frame and bag assembly is supported by a filter frame header wherein the sub-frame is inserted into an inward facing channel of a corresponding sized and shaped main header frame. The header frame is made from a longitudinal channel having three miters spaced out along the channel and a fourth miter at one end. The three miters are bent at right angles with the U-channel facing inward.

U.S. Pat. No. 4,356,011 incorporated by reference herein in its entirety teaches a typical pocket filter assembly. A pocket filter cartridge for removing solid particulate from a dirty gas stream including a plurality of sheath-like filter bags suspended from a common header assembly in side-by-side relation. Each of the filter bags includes a plurality of alternating rows of filamentary stays or span stitching spaced across the width of the bag and extending generally parallel to one another along its length so that upon inflation of the bag by the dirty gas stream during use, the stays shape the bag into a plurality of adjacent tube-like sections opening into one another within the bag. The stays in each row are sized to be of a different length than the stays in the rows adjacent to it to alternately vary the thickness of the bag at the juncture of the tube-like sections formed in the bag.

Typically, one or more of the filter cartridges are secured across the interior of a gas duct so that particulate materials are separated from the gas stream as it flows through the filter media from the interior of each of the filter pockets. When it becomes necessary to replace the filter media in the filter cartridge, the entire cartridge is removed and thrown away and a new cartridge installed in its place.

In filter arrangements of this type, it is necessary to minimize contact between the adjacent filter bags to maintain a uniform flow of gases through the filters as well as to effectively utilize the entire area of the filter media in the filter bags. If this is not done, there can be a substantial pressure loss in the air stream as it flows through the filter cartridge with an attendant increase in the energy required to operate the system. One way of doing this has been to sew the opposing walls of each of the filter bags together so that the filter assumes the shape of a series of separate, adjacent tube-like sections upon its inflation by the gas stream during use. However, while that type of arrangement has proven to be very effective in maintaining separation between the adjacent filter bags, the filter media proximate each of the seams is unavailable for filtering and thus larger and bulkier filters have generally been required. Other arrangements have maintained separation between the adjacent filter bags by shaping them in a tapered or wedge-like configuration. This approach has also proven effective but similarly has required the use of larger filters as well as being relatively difficult to manufacture.

One preferred filter cartridge includes a plurality of relatively flat, sheath-like filter bags suspended from a generally rectangular header assembly in side-by-side relation. Each of the filter bags is assembled from a pair of generally rectangular panels or sheets of flexible filter media sewn together on three sides to form the closed downstream end of the bag and open on the remaining side to form the mouth of the bag which is secured to the header assembly. The filter bag includes a plurality of alternating rows of filamentary stays or span stitching spaced across the width of the bag and extending generally parallel to one another along its length so that upon inflation of the bag by the dirty gas stream during use, the stays shape the bag into a plurality of adjacent tube-like sections opening into one another within the bag. This relatively compact and easily fabricated arrangement effectively maximizes the surface area of the filter media available for filtration while at the same time maintaining sufficient separation between the bags to minimize pressure losses in the gas stream flowing through the filter cartridge.

In this type of filter arrangement, it is necessary to minimize contact between adjacent filter bags to maintain a uniform flow of gases through the filters as well as to effectively utilize the entire area of the filter media in the filter bags. Otherwise, there can be a substantial reduction of air speed through the filter cartridge and an increase in the amount of energy required to propel air through the system. One way of doing this has been to sew the opposing walls of each of the filter bags together to maintain the shape of the filter assembly to resemble tube-like sections when inflated by the gas stream during use. However, while that type of arrangement is very effective in maintaining separation between the adjacent filter bags, the filter media around each of the seams is unavailable for filtering thus reducing filter efficiency. Other arrangements have maintained separation between the adjacent filter bags by shaping them in a tapered or wedge-like configuration. This approach has also proven effective but similarly requires the use of larger filters which are relatively difficult to manufacture.

A conventional header assembly includes a generally rectangular frame and a plurality of elongated rectangular collars, each of which is aligned in the mouth of one of the filter bags and supported within the frame to secure the filter bags to the header assembly. After the collars are positioned in the filter bags, they are secured together by rivets so that the filter media forming the mouth of each of the filter bags is clamped between the adjacent collars as shown in prior art FIGS. 1 and 2. Thereafter, the four legs of the frame are secured about the outermost ends and sides of the collars so that the outermost portions of the filter bags are clamped between the legs of the frame and the collars to complete the assembly.

U.S. Pat. No. 4,356,011 teaches a multi-bag filter cartridge with a main frame holding the wedge shaped bags in a side-by-side arrangement. US Patent Publication No.

201300744636 teaches a filter element for filtering fluids wherein the filter element includes a plurality of wedge shaped sections in a side-by-side arrangement with an outer frame comprising an upper channel member and a lower channel member.

SUMMARY OF THE INVENTION

In accordance with the present invention, there is provided a filter cartridge for removing particulate matter from a stream of gas passing through said filter comprising, consisting of, or consisting essentially of a plurality of filter bags held open by rectangular sub-frames and a main frame securely holding the plurality of filter bags and sub-frames together. The plurality of generally wedge shaped filter bags each has one open end containing a rectangular flat ring forming a sub-frame. The sub-frame securely holds the open end of the bag fully open. The plurality of filter bags are aligned in a side-by-side arrangement with the flat sub-frames being parallel to and adjacent to one another and the sub-frames are rigidly fastened to one another, thus forming a rectangular filter bag and sub-frame assembly. The main frame surrounds and rigidly grasps the filter bag and sub-frame assembly. The main frame comprises a longitudinal channel member having three internal miters formed therein at spaced apart intervals and an end miter at a first free end. The channel is deformed at an angle of ninety degrees at each internal miter thus forming a rectangular main frame. The open side of the channel faces toward the center of the rectangular main frame. The first free end of the longitudinal channel member has a tab adjacent to the end miter and extends into the channel. The tab has a plurality of parallel ratcheting teeth pressed thereinto and located at a center of the tab. The teeth are parallel to the outer edge of the tab. The second free end of the longitudinal channel member has a rectangular portion of an outer side of the channel stamped into and pressed downward into the outer side of the channel about one quarter inch from an end edge of the second free end and being the width of the channel. The top surface of the rectangular portion extends below a bottom surface of the outer side of the channel and forms a gap there between wide enough for the tab to slide therethrough. The rectangular portion has an upward extending lip at a center of a distal edge thereof. The tab is capable of sliding through the gap and the lip is capable of cooperatively engaging and securely seating between a selected pair of the ratcheting teeth, and thereby locking the tab into the gap and holding the main frame securely around the filter bag and sub-frame assembly.

A longitudinal channel member comprising a base channel and upwardly extending channel sidewalls, a pair of spaced apart aligned longitudinal reinforcement ribs extending along the longitudinal channel base, the channel sidewalls including a pair of inwardly projecting longitudinal shoulders spaced apart from and aligned with the reinforcement ribs, the longitudinal channel member including a first male end including a tab with two lateral half paws or tangs for cooperatively engaging an opposing channel receiver including two lateral lanced portions forming inwardly raised transverse flanges on either side of the channel base, each with an upwardly projecting lip for cooperative engagement with the two tangs disposed on the tab surface of the opposing distal end of the longitudinal channel member, the channel receiver having two inwardly extending mounds which cooperatively engage an inwardly canted end portion of the tab to maintain engagement of the tangs with said upwardly projecting lips.

The invention is a modification of existing filter media frames. These frames are used in a variety of ways in the air filtration industry. Some are used as headers for the front end of metal rigid cell air filters; others are used as the frame for pocket filters. The cross sections vary from a simple channel shape to a modified media saver cross section. They are typically mitered in some way in three locations so as to form a rectangle when each miter is bent from 80 to 90, more preferably from 86 to 90 degrees and typically at about 90 degrees.

Typically, these frames have a "tab" end and "receiver" end. The tab end slides into the inside of the receiver end to form the fourth corner of the frame. The current method of fastening the two ends is through the use of a "pop" rivet thru a round hole punched in both the tab and the receiver.

The present invention does away with the rivet entirely while providing a tighter connecting of the tab end to the receiver end of the frame, thus providing a tighter connection and a stronger frame. No rounds holes are punched in the tab or the receiver. The tab has a series of ratcheting teeth formed into it. These teeth are made with sharp edges on the inside of the tab. The mating receiver has a stamped section that runs across the web of the cross section. The stamped section is depressed toward the inside of the cross section a bit more than the tab thickness. One edge of the stamped and formed surface is also formed with an upturned lip that acts as a "pawl" which cooperatively engages the teeth in the tab. This new design not only does away with the rivet, but is also quicker and easier to assemble. Because there are several teeth in the tab, a variable tightness is provided wherein the tab may be pushed harder into the mating stamped section. As the lip engages the next tooth, a tighter connection is established. As the tab is inserted into the stamped section of the receiver, the teeth will be forced one after another over the lip of the stamped section until a tight connection is established between the two ends of the frame.

The stamped section acts as a spring to allow the teeth to pass over the lip. The lip snaps tightly behind the engaging tooth and the stamped section is ready to be flexed again for the next tooth as the tab is forced further.

This plurality of teeth in the tab allow the frame to pushed together tightly. This removes any "rattle" in the connection as well as helping to minimize overall racking and twisting in the frame making the frame more ridged.

It is an object of this invention to provide a multi-bag filter cartridge including a main rectangular frame holding the wedge-shaped bags together in a side-by side arrangement and wherein open end of the bags is held open by rectangular sub-frames which are fastened together to form the filter element held with the filter cartridge.

It is an object of this invention to provide a multi-bag filter cartridge including a main rectangular frame holding the wedge-shaped bags together wherein the rectangular frame is a longitudinal channel with three spaced apart miters allowing the channel to be bent at the three miters and the resulting two ends of the channel are fastened together to form a rectangular frame with the open side of the channel facing towards the center of the frame.

It is an object of this invention to provide a multi-bag filter cartridge including a main rectangular frame holding the wedge-shaped bags together in a side-by side arrangement as described above wherein the first free end of the rectangular frame contains a tab extending toward the second end of the frame as the frame is assembled, and the first end includes ratcheting teeth, and the second end of the frame includes a stamped pocket with a lip which cooperatively engages the ratcheting teeth on the first end, thus locking the two ends together.

It is an object of the present invention to provide a means for adjusting a header frame in order for it to be pushed together tightly and remove any "rattle" in the joint or connection and minimize overall racking and twisting in the frame increasing rigidity.

It is an object of this invention to provide multi-bag filter cartridge including a main rectangular frame holding the wedge-shaped bags together in a side-by side arrangement wherein the channel includes two shoulders spaced apart from the inner-most surface of the channel, thus providing a more rigid frame and a particular spacing of the filter bags within the frame.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein.

DESCRIPTION OF THE PREFERRED EMBODIMENTS

Pocket filter assemblies having at least one and typically a plurality of filter bags having an open end attaching to a rectangular flat sub-frame fastened inside the open end of the bag. The sub-frames are fastened together, side by side, and then the sub-frame and bag assembly is supported by a filter frame header wherein the sub-frame is inserted into an inward facing U-shaped channel of a corresponding sized and shaped main header frame. The header frame is made from a longitudinal channel having miters spaced out along the channel and a distal end. The inner miters are bent at right angles with the U-channel facing inward. The filter frame header locking device holds the ends of the header frame together after installation of the sub-frames.

In accordance with the drawings, there is provided a filter cartridge 10, containing a plurality of filter bags 12 having a sub-frame 14 inserted in the open ends thereof and fastened to one another is side-by-side arrangement, the entire assembly being held with a rectangular main frame or filter frame header 40 made from channel material.

Figure 1:
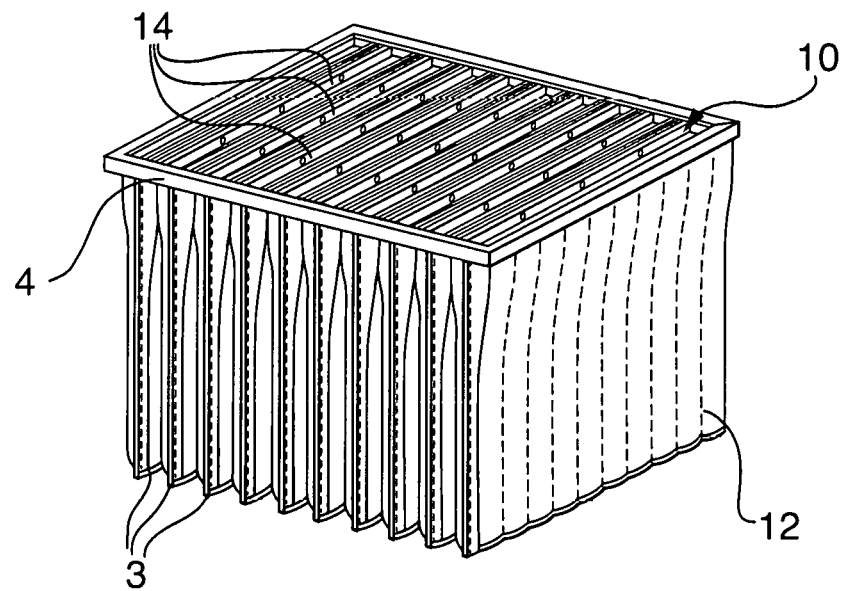
FIG. 1 is a front perspective view of a prior art header assembly including sub-frames supporting pocket filters therein.
Figure 2:
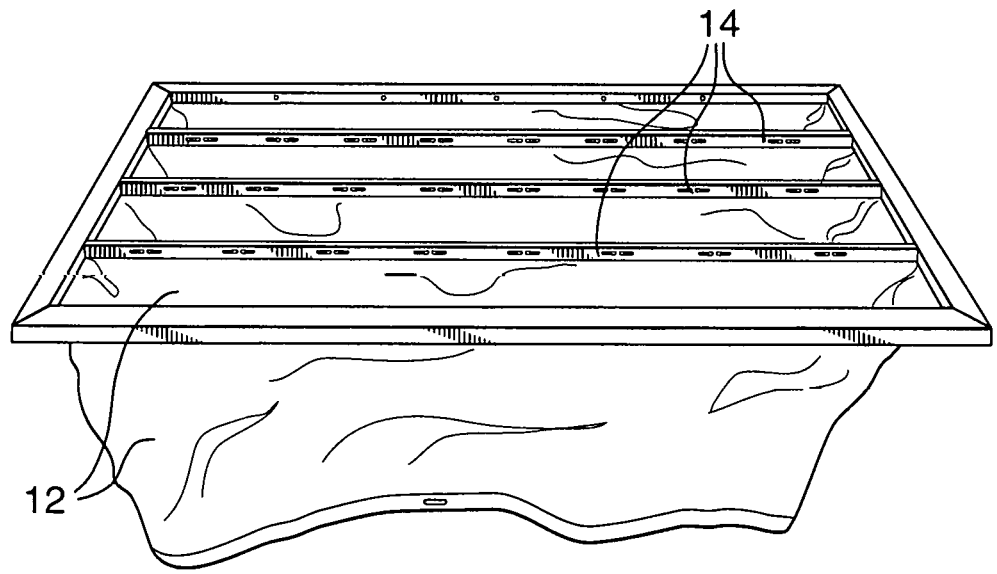
FIG. 2 is a top perspective view of the prior art filter cartridge assembly of FIG. 1 showing attachment of the pocket filters to the sub-frame.
Figure 3:
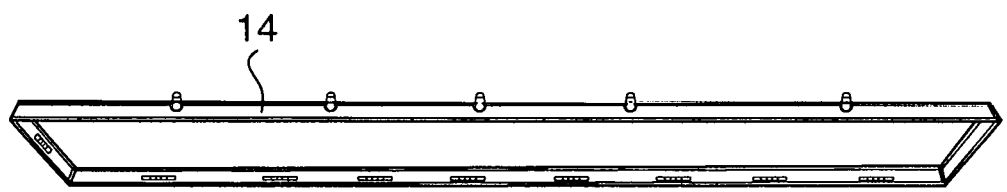
FIG. 3 shows is a perspective view of one of the prior art sub-frames used to hold open one of the filter bags of FIG. 1.
Figure 16:
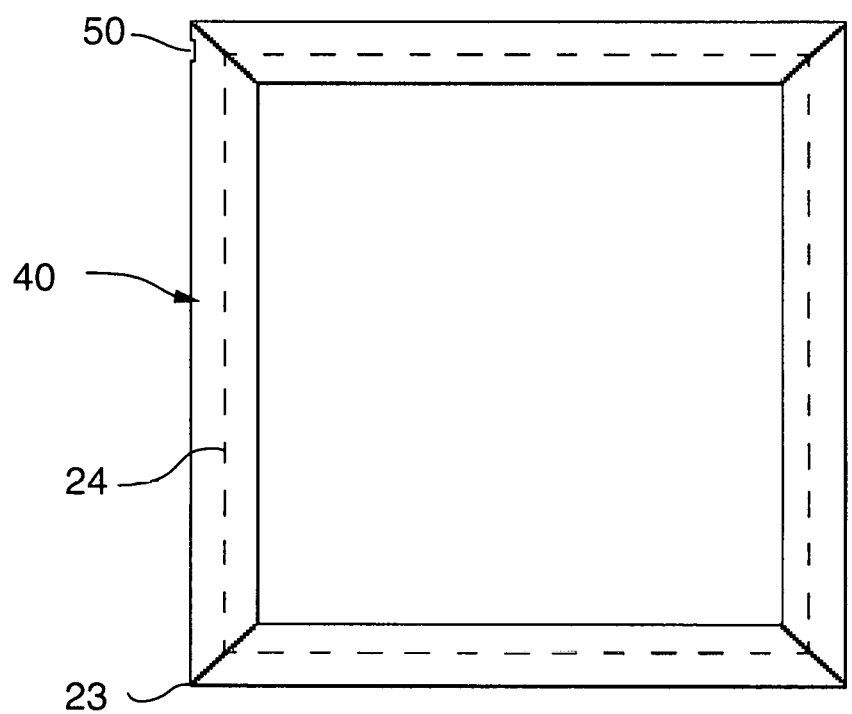
FIG. 16 is a top view of the header frame assembly of the embodiment shown in FIGS. 6-15 with the shoulders shown in broken lines.

As can be seen in FIGS. 1-2, a plurality of filter bags 12 each have a rectangular sub-frame 14 placed just inside the open end and the sub-frames in the bag openings are then aligned in a side-by-side arrangement and fastened together by crimping or stapling the sub-frames together. Then the main frame 40 is formed around the outside of the four-sub-frame assembly.

Figure 6:
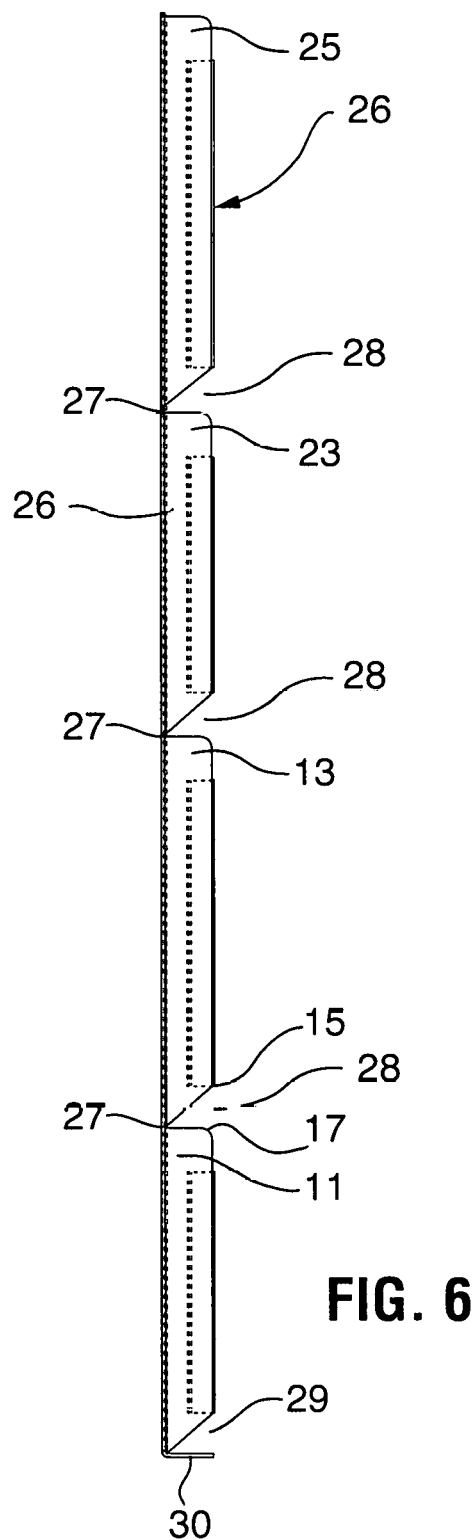
FIG. 6 is a plan view of the distal ends of the prior art header frame longitudinal channel member showing the free ends ready to be fastened together.

The main frame cross sections vary from a simple channel shape to a modified media saver cross section. As illustrated in FIG. 6, a main header frame 40 is fabricated from at least one longitudinal channel member 26 formed having a generally flat longitudinal channel base 11 with upturned longitudinal edges forming opposing channel sidewalls 13. Individual longitudinal members can be attached to one another at 90 degree angles; however, a single length of channel is typically mitered (typically at a 45 degree angle), in at least three inner locations with the fourth miter formed at a distal end for connecting to an opposing cooperatively engaging distal end with connecting means such as a tab and recess, tongue and groove arrangement, or overlapping tabs.

The channel members 26 shown in the embodiments have three spaced apart inner miters 28 and an end miter 29 cut of formed in the channel sidewalls 13. The miters 28 are cut forming a "V-shaped" notch 27 having an acute angle of a selected distance at a the two facing sidewall edges, angled end edge 15 and straight end edge 17 forming corners 23 adjacent to the miters which are pinched together when the channel member 26 is bent inwardly at the notch 27 so that the open face of the channel faces inward and the miter cuts are exposed, as shown in FIG. 6. The main header frame 4 and 40 is thus formed around the sub-frame assembly and into a rectangular frame. The cut of the angles of the mitered sections is not critical as long as the notches allow bending the channel at approximately a 90 degree angle to form an enclosed rectangular frame.

Figure 4:
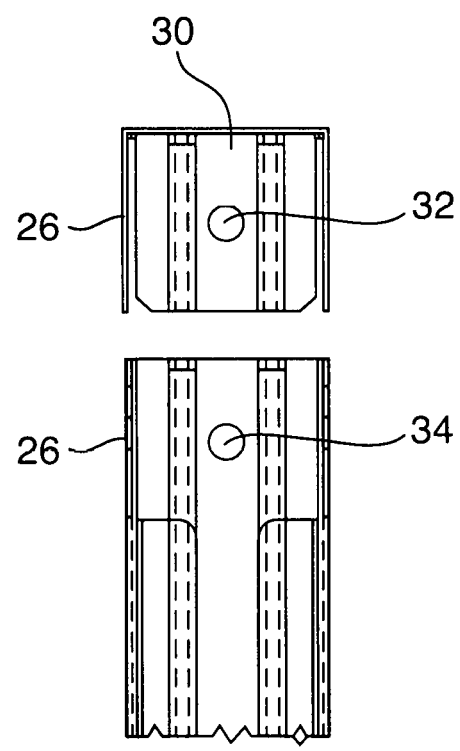
FIG. 4 is a plan view of the distal ends of the prior art header frame channel showing the free ends ready to be brought together to align the two holes and insert a rivet that fastens the two free ends of the frame together.
Figure 5:
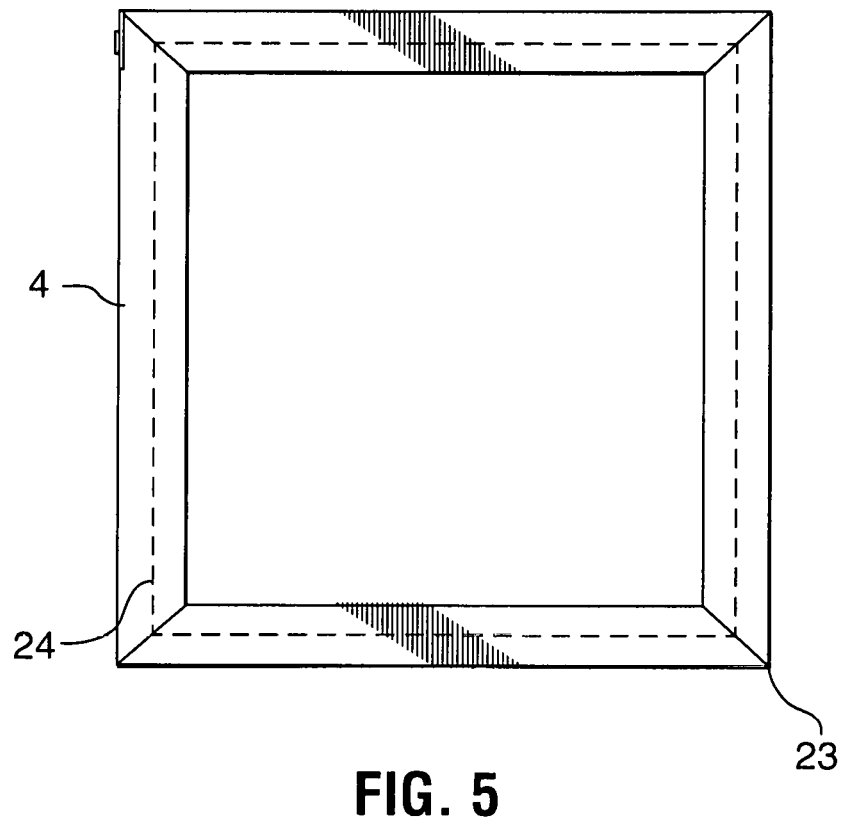
FIG. 5 is a top view of the prior art header frame assembly of FIG. 1.

Filter frame pocket filter and header assemblies includes at least one cartridge containing a plurality of filter bags 12 with rectangular sub-frames 14 held together by a main frame 4. The header frame channel member 26 is folded at the four corners notches 27 around the filter assembly and the sub-frames 14. As shown in prior art FIG. 4, conventional methods of affixing the ends of the longitudinal channel 26 together is accomplished by overlapping a tab 30 extending and aligning a hole 32 from the first free end of the longitudinal member 26 over a tab 30 having a hole 34. A fastener such as a pop rivet is installed in the aligned holes to connect the ends of the frame completing the header as shown in FIG. 5.

Figure 7:
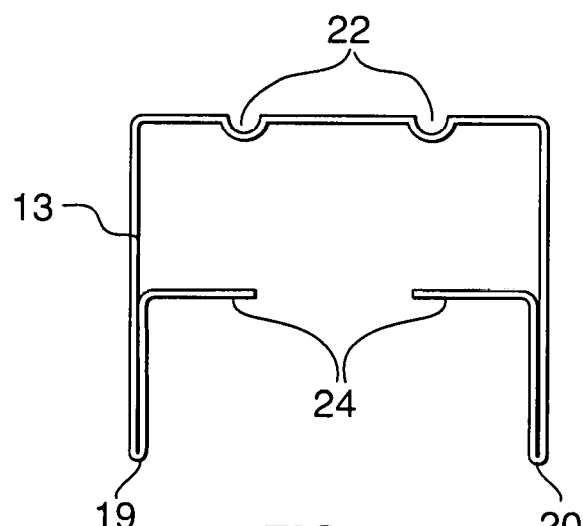
FIG. 7 is a sectional view of the longitudinal channel of the header showing the channel base, channel sidewalls, and shoulders formed therein.
Figure 8:
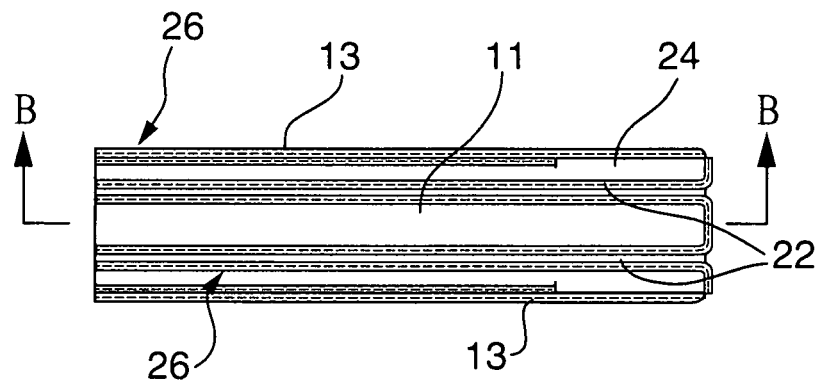
FIG. 8 is a top view of the header showing a first free distal flanged end defining a tab portion of a first the longitudinal channel including the channel base, channel sidewalls, reinforcement ribs and shoulders.

FIG. 7 shows an end sectional view of the longitudinal channel member 26 of the present invention wherein a selected portion 19 of a top portion of the longitudinal channel sidewalls 13 are folded over 180 degrees forming a double walled channel sidewall 20 adjacent an inner surface of channel sidewall 13. A selected portion of each one of the top edges of the channel sidewalls 19 are formed or bent at about a 90 degree angle extending inwardly spaced apart and aligned with one another for a selected distance (as shown in FIG. 7, about ⅓ of the distance across the longitudinal channel base 11) forming opposing flanges defining medial shoulders 24. It is contemplated that the shoulders could be formed separately from the channel as an insertable member held in the channel by a friction fit, adhesive, soldering, welding, or other attachment means. The shoulders 24 can be any desired length or depth or can be omitted if desired, for a simpler main frame.

The outer edge of the sub-frame 14 and filter bag assembly is inserted into the channel and abuts and is stopped by the shoulders 24. This serves to locate the sub-frame assembly in a preferred position with in the main frame 40. The shoulders also strengthen the main frame. Preferably at least one or more longitudinal reinforcement ribs 22 are formed in the longitudinal center channel base 11 to further stiffen the channel member 26 and to aid in alignment of the subframe assembly 14 held within the frame 26. The ribs 22 have a concave cross-sectional area with the arcuate portion extending inwardly and up from the channel base 11. As shown in FIG. 7, the shoulders 24 extend inwardly and pass the outer edge of the ribs 22.

A novel feature of the present invention is the design of a filter frame header 40 locking mechanism which holds the distal ends of the header frame and channel assembly tightly together without the use of conventional rivets holding members.

Figure 9:
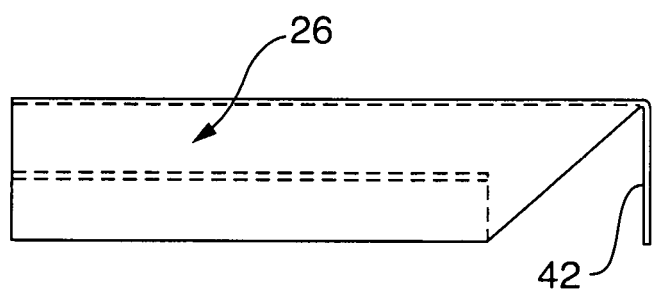
FIG. 9 is a sectional side view of the header taken along line B-B of FIG. 8 showing the multi-toothed engagement tab.
Figure 11:
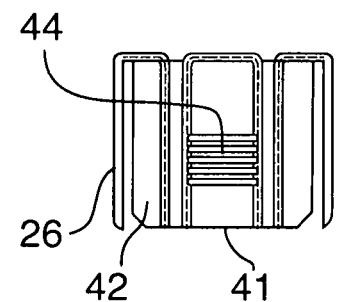
FIG. 11 is an end view of FIG. 8 of the header showing the multi-toothed engagement tab positioned between the ribs in the channel base.
Figure 10:
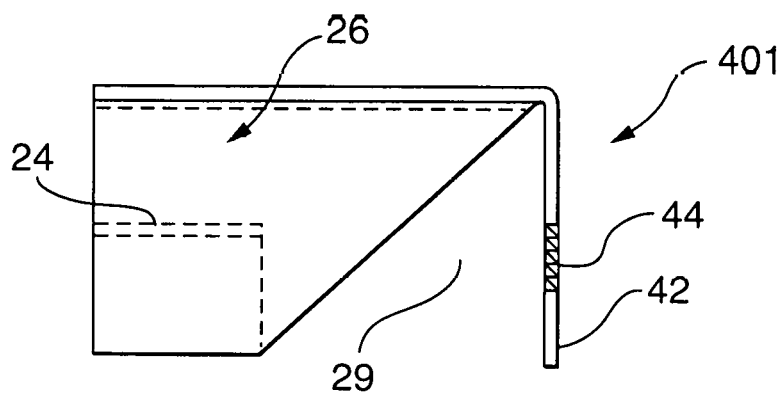
FIG. 10 is a lateral cross-sectional view of the header of FIG. 8 showing the channel base and sidewalls taken along line B-B in the direction of the arrows in FIG. 7 showing the engagement tab.

As shown in FIGS. 8-11, a first free distal flanged end 401 defines a tab projecting from the distal end of the longitudinal channel base between the channel sidewalls 13 and centrally disposed between a pair of reinforcing ribs 22 and shoulders 24. The tab 42 is bend inward from the channel base at a selected angle of from 70-110 degrees and more preferably from 80 to 100 degrees and most preferably at about 85-90 degrees. The tab in shown in FIG. 9 is bent at about a 90 degree angle for insertion in the recess formed in the opposing second distal receiver end of the longitudinal channel base 26. The multi-toothed engagement tab 42 includes a plurality of raised ratcheting teeth 44 centered on the tab 42 between the ribs 22. The teeth are stamped or impressed into the metal tab and form spaced apart transverse angled ridges aligned parallel to one another and parallel with the end edge 41 of the tab 42. A front distal end portion 45 of the tab 42 is smooth to provide a guide surface for feeding the tab 42 into the recess within the receiving section of the cooperatively engaged opposing channel end.

Figure 12:
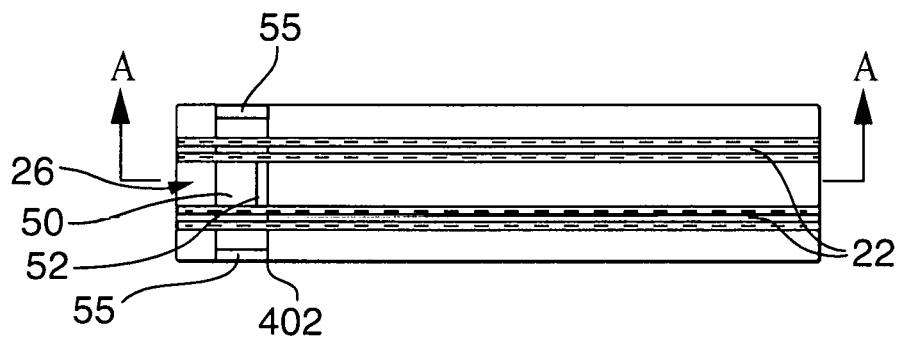
FIG. 12 is a top view of the header showing the opposing second free distal end defining a receiver end of the header channel on the multi-toothed tab shown in FIGS. 8-11.
Figure 13:
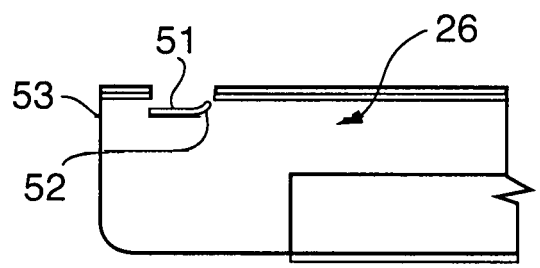
FIG. 13 is a cross-sectional view of the header of FIG. 12 along lines A-A.

FIG. 12 shows a top view of the opposing second free distal end defining a receiver end of the header channel showing the lanced section extending across the web of the channel depressed toward the inside of the cross section a selected depth that is greater than the tab thickness and a medial edge of the lanced and formed surface between the ribs is formed with an upturned lip that functions as a pawl for the ratchets on the multi-toothed tab shown in FIGS. 8-11. FIG. 13 shows the shoulders upturned lip that functions as a pawl for the ratchets on the multi-toothed tab shown in FIG. 11. The ribs, shoulders and lanced and formed receiving sections shown in FIG. 14 act as a spring to allowing the ratchet to pass over the pawl and pop back to its prior location ready to be flexed again as the tab is inserted into the receiver. The receiver shown in FIG. 15 includes channel shoulders and a lanced section extending across the web of the channel depressed toward the inside of the cross section a selected depth that is greater than the tab thickness and a medial edge of the lanced and formed surface between the ribs is formed with an upturned lip that functions as a pawl for the ratchets on the multi-toothed tab shown in FIGS. 8-11.

As best illustrated in FIGS. 12-15, the second opposing distal end 402 forming the receiver a receiver includes a lanced section or gap 53 extending across the web of the channel base 11 depressed inwardly toward the inside of the cross section a selected depth that is greater than the tab 44 thickness forming a transverse flange 51. A medial edge of the lanced and formed surface forming the flange 51 between the ribs is formed with an upturned lip 52 that functions as a pawl for the ratchets or teeth 44 on the multi-toothed ratcheting tab 42 at the first free end 401 of the main frame 40 and is bent inward at a ninety degree angle with the outer side of the frame so that the tab is contained within and aligned with the receiving portion of channel 26.

The second end 402 of the channel containing the lanced portion 51 pressed into the channel forming a recess displaced downward enough to form a gap 53 so that the tab 42 can be inserted between the bottom surface of the top outer edge 43 of the second free end 402 of the channel and the top surface of the displaced portion 51. Further, the distal edge of the displaced portion 51 contains an upward extending rearward lip 52. As the tab 42 slides through the gap 53, the lip 52 snaps over and past consecutive ratcheting teeth 44 until the tab 42 is fully engaged into the second free end of the main frame. The lip 52 is then tightly held between a particular pair of ratcheting teeth. At this point the distal ends of the channel 26 of the main header frame 40 is pressed snugly into highly secured around the sub-frame and filter bag assembly.

Figure 17:
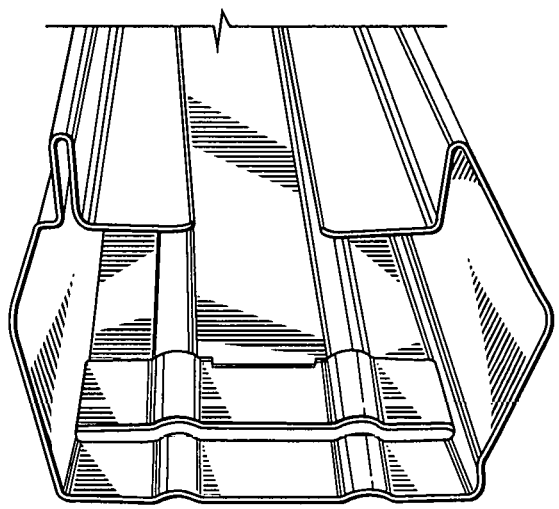
FIG. 17 is an end view of the header showing the receiving end of the channel.
Figure 18:
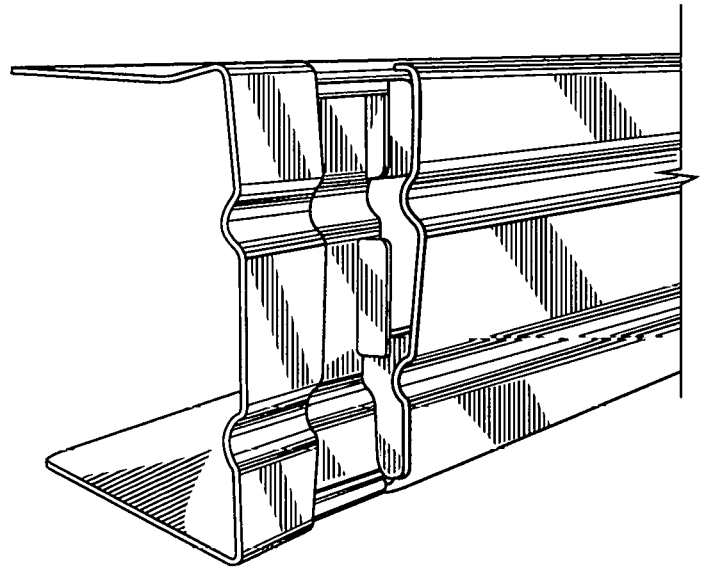
FIG. 18 shows the receiving end of the header of the channel showing the outer surface of the base channel.

FIG. 17 illustrates an end view showing the receiving end of the channel showing the channel base, channel sidewalls, shoulders, ribs, and a lanced portion forming an inwardly raised transverse flange extending across channel base web. The receiving end of the channel includes the outer surface of the base channel together with the channel sidewalls, ribs, and a lanced portion forming an inwardly raised transverse flange extending across channel base web with an upwardly projecting lip for cooperative engagement with the ratcheting teeth disposed on the tab surface of the opposing distal end of the longitudinal channel member as best shown in FIG. 18.

Figure 19:
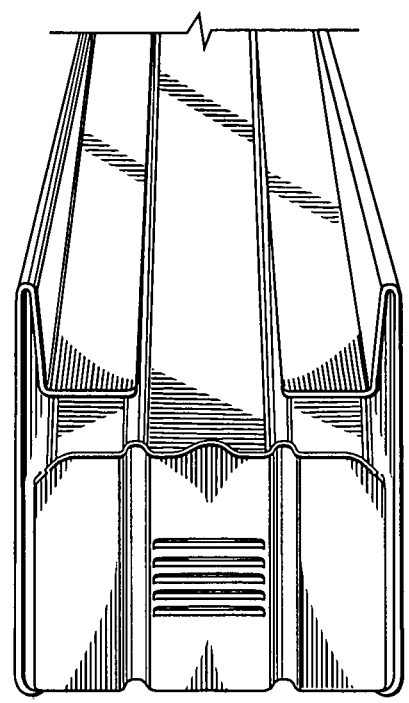
FIG. 19 shows the insertable male end of the longitudinal channel of the header.
Figure 20:
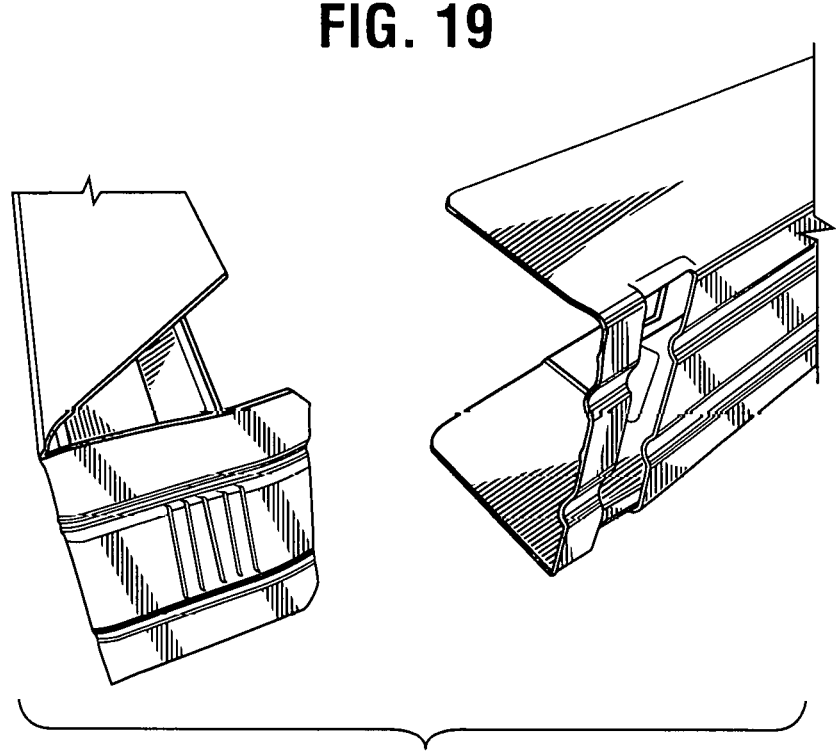
FIG. 20 shows the insertable male end of the longitudinal channel and opposing receiver end of the longitudinal channel of the header.

The insertable male end of the longitudinal channel including the channel base, channel sidewalls, shoulders, ribs, and tab with spaced apart transverse ratcheting teeth disposed on the tab surface of the opposing distal end of the longitudinal channel member between the ribs is shown in FIG. 19. FIG. 20 shows the insertable male end of the longitudinal channel and opposing receiver end of the longitudinal channel.

Figure 21:
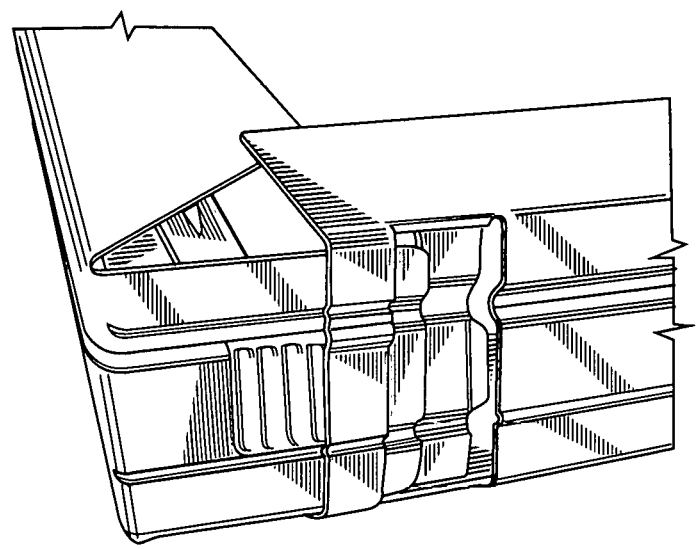
FIG. 21 shows the male end of the longitudinal channel inserted into the gap between the transverse flange of the lanced portion and the channel base of the header.

FIG. 21 illustrates the male end of the longitudinal channel inserted into the gap between the transverse flange of the lanced portion and the channel base wherein the tab is bent at an angle or curved downward slightly to facilitate ease of entry and cooperative engagement with the upturned locking lip of the transverse flange. The tab is bent at an angle or curved downward slightly to facilitate ease of entry and cooperative engagement with the upturned locking lip of the transverse flange.

Figure 22:
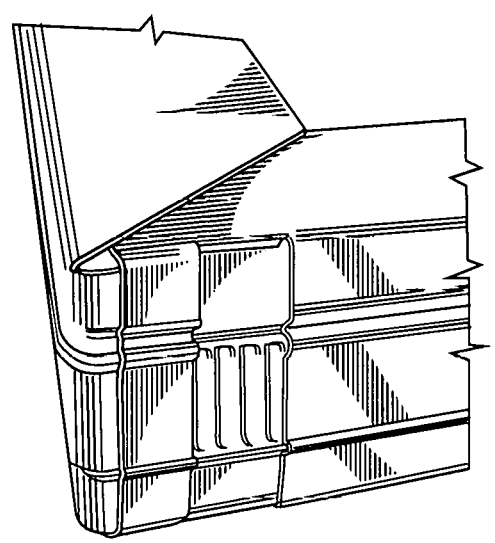
FIG. 22 is an exterior view of the header showing the male end of the longitudinal channel inserted into the gap between the transverse flange of the lanced portion and locked into cooperative engagement with the upturned locking lip of the transverse flange.
Figure 23:
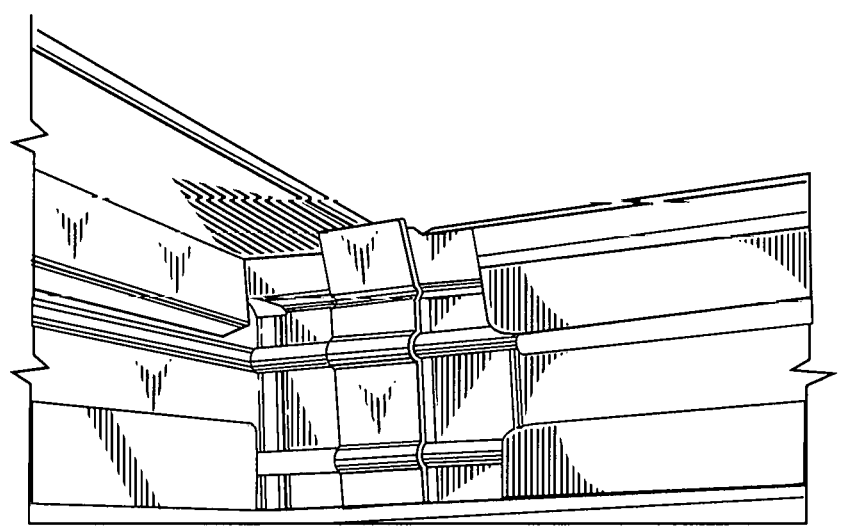
FIG. 23 is an interior view of the of the header frame with the male end of the longitudinal channel inserted into the gap between the transverse flange of the lanced portion and locked into cooperative engagement with the upturned locking lip of the transverse flange.
Figure 24:
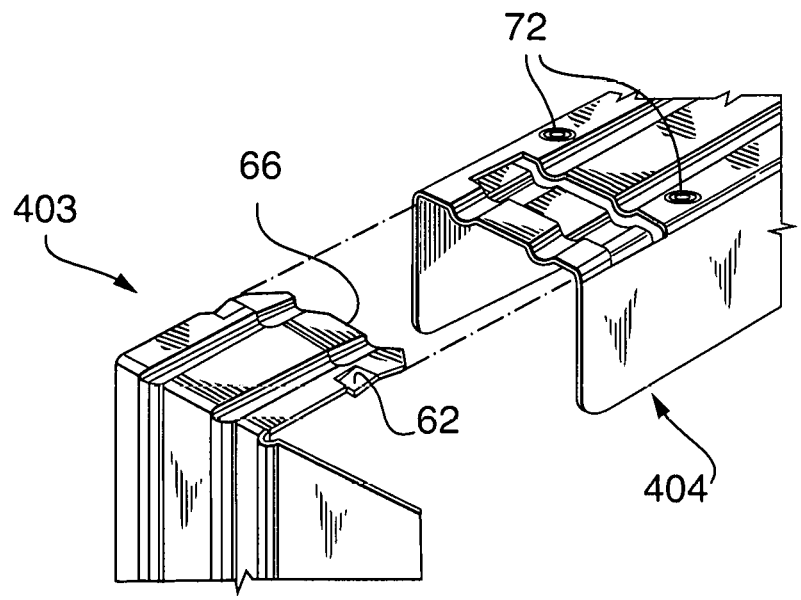
FIG. 24 is a perspective view of a half tang frame wherein the first free end of the rectangular frame contains a tab including two lateral tangs or pawls extended toward and inserted into a gap in the second receiving end of the frame including a stamped pocket with two laterally located lances, each including a lip which cooperatively engages one of the two lateral tangs on the tab, thus locking the tab into the gap.
Figure 25:
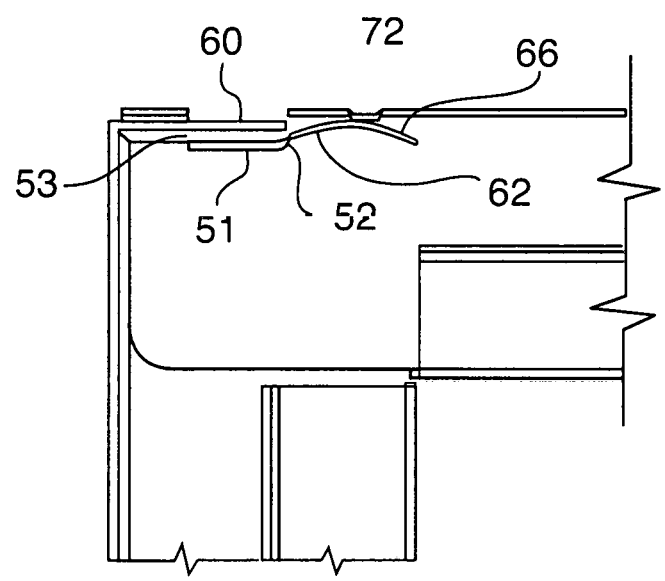
FIG. 25 is a cross-sectional view of the two ends of the frame assembled together, showing the half tang snapped in against the edge of the lip.
Figure 26:
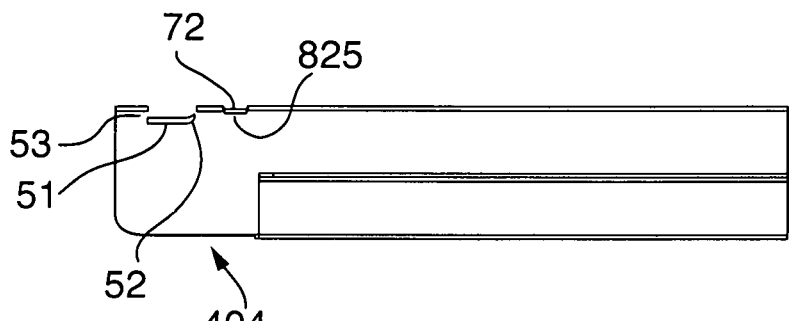
FIG. 26 is an outside view of the second free end of the frame containing the gap and the two lips.
Figure 27:
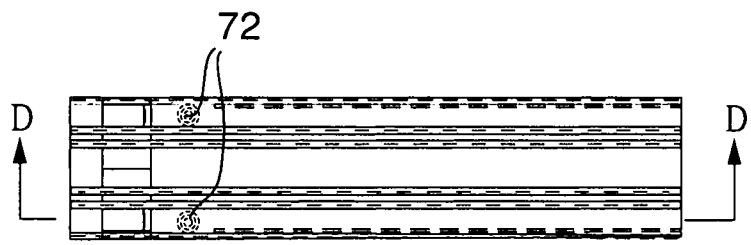
FIG. 27 is the cross-sectional view taken along line DD in FIG. 37.
Figure 28:
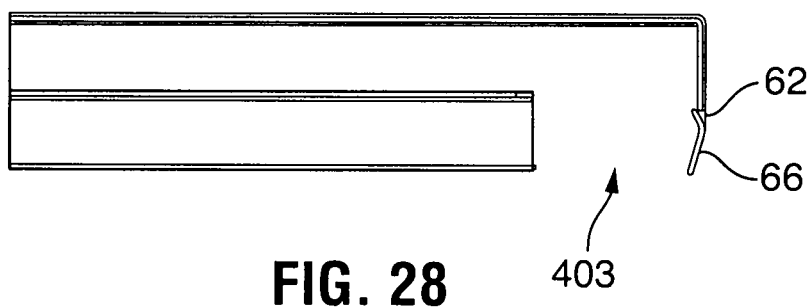
FIG. 28 is an outside view of the first free end of the frame containing the tab with lateral tangs.
Figure 29:
FIG. 29 is the cross-sectional view EE as referenced in FIG. 39.
Figure 30:
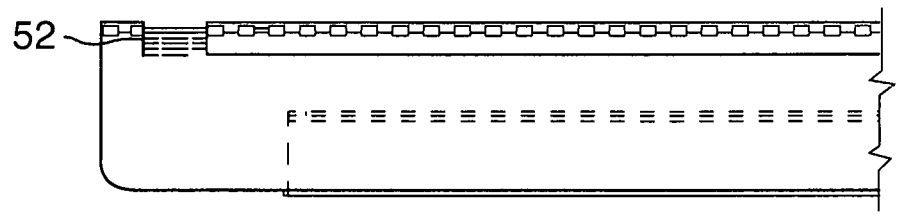
FIG. 30 is a side view of the second free end of the frame.
Figure 31:
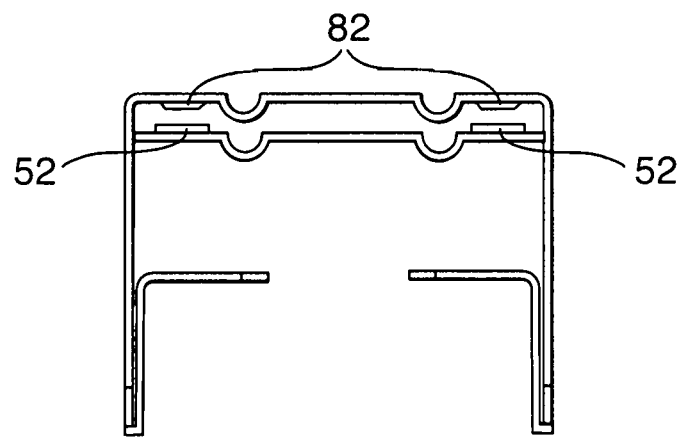
FIG. 31 is an end view of the second free end of the frame showing the gap, the lips and the inward extending mounds formed when the dimples are made.
Figure 32:
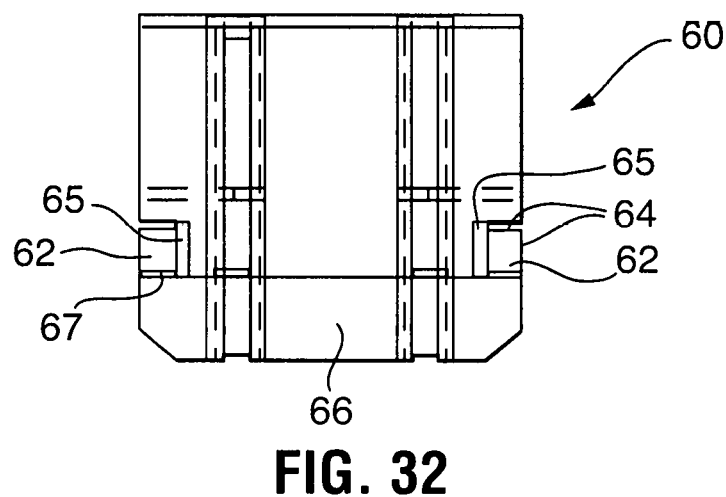
FIG. 32 is an end view of the first free end of the frame showing the outer surface of the tab.

FIG. 22 shows the exterior male end of the longitudinal channel inserted into the gap between the transverse flange of the lanced portion and locked into cooperative engagement with the upturned locking lip of the transverse flange, and FIG. 23 shows the interior view of the male end of the longitudinal channel inserted into the gap between the transverse flange of the lanced portion and locked into cooperative engagement with the upturned locking lip of the transverse flange.

As illustrated in FIGS. 24-32, the filter header utilizes a saddle on the receiver "female" end with two paws on each side instead of one in the center providing a tab end without any ratchets, utilizing a pair of "half lances" instead to fasten the ends of the header frame together. The header assembly comprises or consists of a frame including a longitudinal channel mitered in three places; however, rather than using a central row of ratcheting teeth on the first free end which cooperatively engage a lip in a gap formed in the second free end, the header saddle includes a first free tab end 403 which includes a tab 60 whose end portion 66 is canted slightly inward toward the receiving end.

The FIGS. 24-32 show the header coupling comprising a half tang frame wherein the two free ends of the rectangular frame with the first free end of the rectangular frame containing a tab which is extended toward and inserted into a gap in the second end of the frame as the frame is assembled, and the tab includes two lateral tangs, and the second end of the frame includes a stamped pocket with two laterally located lances, each including a lip which cooperatively engages one of the two lateral tangs on the tab, thus locking the tab into the gap. The two ends of the frame are assembled together with the half tang snapped in against the edge of the lip. Thus the first free end of the frame contains a tab with lateral tangs. The second free receiving end of the header frame includes a gap having lips and inward extending raised portions defining mounds, a pair of dimples, or other means of biasing which provide spring action to keep the lance pushed up against the paw.

More particularly, the half tang header filter frame contains a frame including a longitudinal channel mitered in three places as before. However, rather than a central row of ratcheting teeth on the first free end which cooperatively engage a lip in a gap formed in the second free end, this embodiment shown in FIGS. 35-43 has a first free end 403 which includes a tab 60 whose end portion 66 is canted slightly inward. On each lateral edge of the tab 60 adjacent to the canted portion 66 are two generally rectangular half tangs 62 whose inward extending edges trail the tangs away from the free end of the canted portions 66. They are called half tangs because only two edges 64 of the rectangular half tangs are free while the other two edges 65 remain connected to the tab 60. Tangs typically are connected only on one of the four edges. It has been determined that three connected edges are needed to provide a strong connection.

Figure 14:
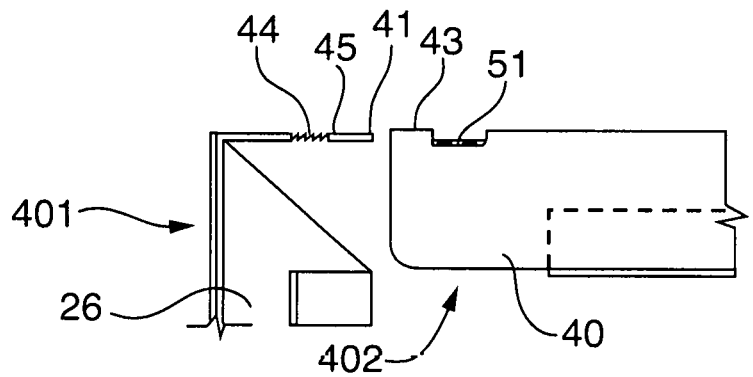
FIG. 14 is a cross-sectional lateral side view of the header of FIG. 12 along line A-A axis in the direction of the arrow.
Figure 15:
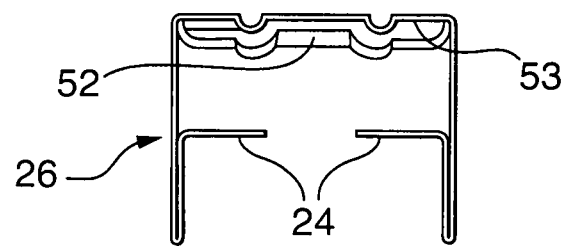
FIG. 15 is a cross-sectional end view of the header showing the second free distal end along lines C-C of FIG. 12.

The second free end 404, is the same as the second free end 402 on the embodiment in FIG. 14 except that two dimples 72 are added near the stamped section forming the gap. The inward extending mounds 82 are formed when the dimples 72 are made. When the tab 60 is inserted into the gap 53 and urged forward through the gap, the tang 62 passes the edge of the lip 52 and springs inward to cooperatively engage the edge of the lip 52. The canted portion 66 of the tab 60 engages the inward extending mound 82 of the dimple 72. This serves to maintain the engagement of the edge of the tang 62 with the edge of the lip 52.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims. Accordingly, this invention is not intended to be limited by the specific exemplification presented herein above. Rather, what is intended to be covered is within the spirit and scope of the appended claims.

I claim:

1. A filter frame header locking device comprising:
a longitudinal channel member comprising a base channel and upwardly extending channel sidewalls, a pair of spaced apart aligned longitudinal reinforcement ribs extending along said longitudinal channel base, said channel sidewalls including a pair of inwardly projecting longitudinal shoulders spaced apart from and aligned with said reinforcement ribs, said longitudinal channel member including a first male end including a tab with spaced apart aligned transverse teeth for cooperatively engaging an opposing channel receiver including a lanced portion forming an inwardly raised transverse flange extending across the channel base with an upwardly projecting lip for cooperative engagement with the ratcheting teeth disposed on the tab surface of the opposing distal end of the longitudinal channel member.

2. The filter frame header locking device of claim 1, including a pocket filter including a plurality of relatively flat wedge-shaped filter bags removably retained in said filter frame head forming a filter cartridge including a series of pocket filters suspended from filter frame in adjacent side-by-side relation.

3. A filter frame header locking device comprising:
a longitudinal channel member comprising a base channel and upwardly extending channel sidewalls, a pair of spaced apart aligned longitudinal reinforcement ribs extending along said longitudinal channel base, said channel sidewalls including a pair of inwardly projecting longitudinal shoulders spaced apart from and aligned with said reinforcement ribs, said longitudinal channel member including a first male end including a tab with two lateral half tangs for cooperatively engaging an opposing channel receiver including two lateral lanced portions forming inwardly raised transverse flanges on either side of said channel base, each with an upwardly projecting lip for cooperative engagement with the two tangs disposed on the tab surface of the opposing distal end of the longitudinal channel member, said channel receiver having two inwardly extending mounds which cooperatively engage an inwardly canted end portion of said tab to maintain engagement of said tangs with said upwardly projecting lips.

4. The filter frame header locking device of claim 3, including a pocket filter including a plurality of relatively flat wedge-shaped filter bags removably retained in said filter frame head forming a filter cartridge including a series of pocket filters suspended from filter frame in adjacent side-by-side relation.

5. A filter frame header locking device consisting of a longitudinal channel member including a base channel having a pair of spaced apart upwardly extending channel sidewalls, a pair of spaced apart aligned longitudinal reinforcement ribs extending along said longitudinal channel base, said channel sidewalls including a pair of inwardly projecting longitudinal shoulders spaced apart from and aligned with said reinforcement ribs, said longitudinal channel member including a first male end including a tab with two lateral half tangs for cooperatively engaging an opposing channel receiver including two lateral lanced portions forming inwardly raised transverse flanges on either side of said channel base, each with an upwardly projecting lip for cooperative engagement with the two tangs disposed on the tab surface of the opposing distal end of the longitudinal channel member, said channel receiver having two inwardly extending dimples cooperatively engaging an inwardly canted end portion of said tab tangs with said upwardly projecting lips.

* * * * *